United States Patent [19]

Hanyu et al.

[11] 4,310,788
[45] Jan. 12, 1982

[54] SPEED CONTROL DEVICE OF SEWING MACHINES

[75] Inventors: Susumu Hanyu; Yoshinobu Tonomura, both of Hachioji, Japan

[73] Assignee: Janome Sewing Machine Co., Ltd., Tokyo, Japan

[21] Appl. No.: 150,173

[22] Filed: May 15, 1980

[30] Foreign Application Priority Data

May 23, 1979 [JP] Japan ............................ 54-62583

[51] Int. Cl.$^3$ ............................................. H02P 5/16
[52] U.S. Cl. ................................. 318/551; 318/313; 318/345 D; 318/345 H
[58] Field of Search .............. 318/313, 345 D, 345 H, 318/551, 70, 480; 250/231 P

[56] References Cited

U.S. PATENT DOCUMENTS

| | | | |
|---|---|---|---|
| 3,475,676 | 10/1969 | Hutson | 318/313 |
| 3,742,233 | 6/1973 | Gorgens et al. | 250/231 P |
| 3,857,077 | 12/1974 | Kasmer | 318/345 D |
| 4,105,938 | 8/1978 | Mathews, Jr. | 318/599 |

Primary Examiner—David Smith, Jr.
Attorney, Agent, or Firm—Michael J. Striker

[57] ABSTRACT

A speed control device for a sewing machine which is adapted to control a speed of the machine motor. The device includes a plurality of photo-conductive fibers arranged in two sets, one set being optically positioned opposite to another. The device also includes a light source which transmits the light to the photo-conductive fibers, a photo-conductive element which receives the light from the fibers and a phase-controlling element connected to the photo-conductive element and to the machine motor. An interrupting plate secured to a step plate of the sewing machine is provided in the device which is adapted for reciprocable movement between the optically sensitive ends of aforementioned two sets of the photo-conductive fibers. The photo-conductive element generates an ignition current in the phase-controlling element in response to a predetermined amount of light transmitted from one set of fibers connected to the light source to another one whereby the phase-controlling element effects the machine motor to change the speed thereof.

4 Claims, 2 Drawing Figures

SPEED CONTROL DEVICE OF SEWING MACHINES

BACKGROUND OF THE INVENTION

The invention relates to a speed control device of sewing machines. It is an object of the invention to provide a control device installed outside of the sewing machine such as a foot step system, which may perform the control without having electric conduction, and therefore does not require any of insulating measures nor causes the electric shock, and which is simple in structure, light in weight and small in scale.

The existing controllers of the sewing machine are many of the foot step systems, and the structures thereof switch the resistance value within the controller, or slide it to effect the resistance control or electronic control so as to change the speed of the machine motor. Even in a case of changing the resistance in the electronic control and so far as a commercial power source is not separated by such as the insulating transformer, the foot step system control device needs the insulating measure suitable to the commercial electric power source, since the controller receives an electric potential of the power source. Therefore the controller is large scaled and there happens the electric shock if the insulation is not sufficient.

SUMMARY OF THE INVENTION

The present invention has beed devised to eliminate the shortcomings of the prior art. It is a primary object of the invention to provide safety since the control device according to the invention may be operated without having the electric conduction.

It is another object of the invention to provide a structure which is simple and light in weight.

These and other objects of the invention are attained by a speed control device for sewing machines having a machine motor and a step plate, comprising an electric power source connected to the motor; a light source also connected to the motor; a control element connected to the motor for phase-controlling current of the motor; a photo-conductive element connected to said control element for generating an ignition current therein; two sets of flexible photoconductive fibers of which one set being adapted to receive light from said light source and the other set being adapted to transmit the light to said photo-conductive element; said sets of said photoconductive fibers being provided with end portions, the end portions of one set being optically positioned opposite the other set of said photoconductive fibers to receive the light from one another; and a light interrupting member adapted to be moved between the end portions of said one set and the end portions of said other set for optically interrupting the light to be passed therebetween and thereby controlling the amount of photoconduction received by said photoconductive element due to the light receiving amount, whereby said control element actuates the motor in a sense of changing the speed of said motor.

Other features of the invention will be apparent from the following description in reference to the attached drawing.

DETAILED DESCRIPTION OF THE INVENTION

Figure 1:
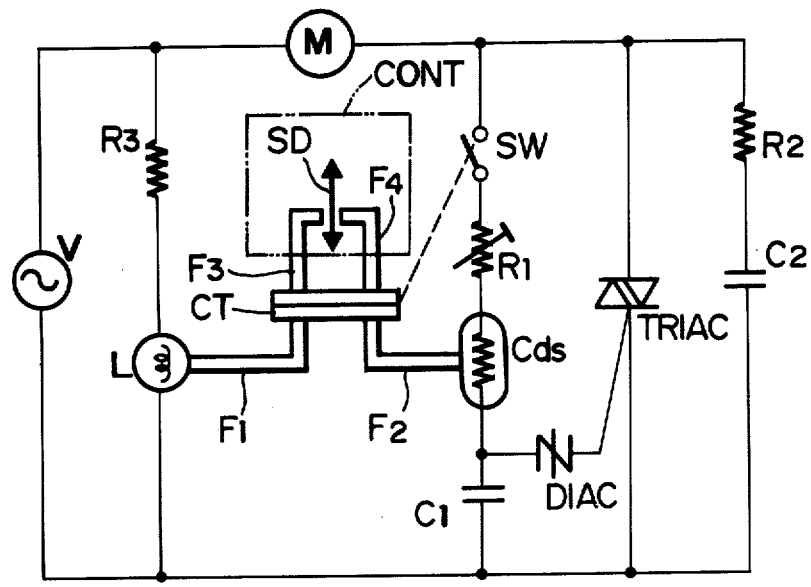
FIG. 1 is a control circuit diagram showing an embodiment of the invention.

The invention will be described in reference to the attached drawing. In FIG. 1, the reference M designates a machine motor which receives AC from a power source V and is phase-controlled by a triac TRIAC. Cds in a photoconductive element which, when receiving the light, decreases the resistance value as the light receiving amount increases and charges a capacitor C1 via the machine motor M and an adjusting semi-fixed resistor R1, and which changes time constants of said charging by the resistance value of the element Cds. DIAC is a bidirectional element for triggering the TRIAC, and makes ignition when the charged voltage of the capacitor C1 reaches its ignition voltage and ignites the triac TRIAC. A resistor R2 and a capacitor C2 constitute elements of the circuit of maintaining current of a triac TRIAC. L is a lamp which is connected to the power source V via a protective resistor R3 and is always lighted and is a light source of the photoconductive element Cds. F1 and F2 designate a pair of plural photoconductive fibers, one end of which is connected to a light input of the lamp L and the other of which is connected to a light output of the photoconductive element Cds. CONT denotes a foot step controller which interrupts the light passing from the flexible photoconductive fiber F1 to the other fiber F2 so as to control the light receiving amount of the photoconductive element Cds. The controller CONT receives elongated parts F3, F4 of the photoconductive fibers F1, F2 via photoconductive connector denoted as CT. The elongated parts F3, F4 are positioned optically opposite each other and are controlled by moving an interrupting plate SD by the foot stepping operation. A normally open switch SW is connected between the motor M and the resistor R1.

Figure 2:
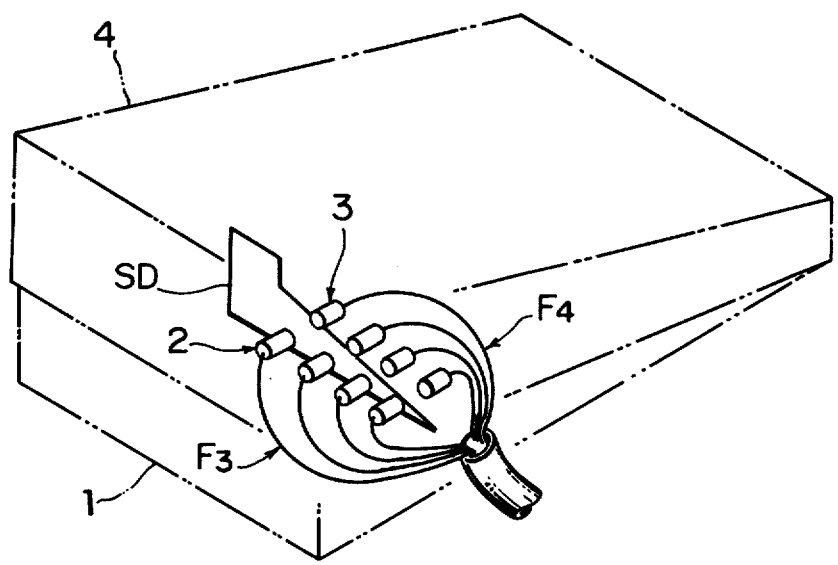
FIG. 2 is a structural view of a control device of the sewing machine.

FIG. 2 schematically shows a structure of the controller CONT, which is located on a step plate 4. The external light is interrupted in a controller casing 1. A plurality of photoconductive fibers F3, F4 are adjacent to their ends 2, 3, respectively which ends are positioned opposite each other to transmit the light in the casing 1. The interrupting plate SD shown also in FIG. 1 has a triangular shape and is mounted on the step plate 4 of the controller CONT to be vertically moved between the respective ends 2, 3 of the photoconductive fibers F3, F4. When the step plate 4 is not operated, the transmission of the light between the photoconductive fibers F3 and F4 is perfectly interrupted, so that the photoconductive elements Cds does not receive the light to make its resistance value infinite. As the stepping amount caused by movement of the step plate 4 increases, the interruption between the opposite ends 2 and 3 is increased from the right to the left as shown in FIG. 2, and at the maximum stepping amount the light is transmitted between the photoconductive fibers F3 and F4 and at this time the resistance value of the photoconductive element Cds is maximal. The photoconductive connector CT is of a plug shape which makes photoconnection and detachable engagement between the photoconductive fibers F1 and F3 as well as fibers F2 and F4. When the connector CT is inserted between the respective fibers the switch SW is closed to make conductive an ignition circuit including the photoconductive element Cds, and vice versa. Thus, the triac TRIAC is prevented from ignition when the photoconductive fiber F2 receives the external light at the position of separation of said connector and the photoconductive element Cds decreases the resistance value. The control device shown in FIG. 1 is electrically insulated and housed in the main body of the sewing machine except of the controller CONT.

In the avove mentioned structure, when the photoconductive connector CT is inserted between the respective fibers prior to driving of the sewing machine, the fibers F1 and F3 as well as F2 and F4 are optically connected to each other and the switch SW is closed. When the controller CONT is not operated, the interrupting plate SD perfectly interrupts the light between the ends 2 and 3 of the photoconductive fibers F3, F4, and the photoconductive element Cds makes its resistance value infinite and the triac TRIAC is not triggered without increasing the electric potential of the capacitor C1. When stepping the step plate 4 of the controller CONT takes place, the photoconduction is provided partially or entirely between the ends 2 and 3 in accordance with the stepping amount of the plate 4, and the receiving amount of the photoconductive element Cds increases or decreases in accordance with this stepping amount. The increase of the light receiving amount brings about the decrease of the resistance value. The charging time constant determined by the resistance and the motor M as well as by variable resistor R1 and the capacitor C1 decreases as the resistance value of the element Cds decreases, and at this time the ignition phase of the ignition element DIAC is controlled to be advanced and the triac TRIAC is phase-controlled and the machine motor M is then controlled and ignited to be shifted to the high speed side. When the connector CT is separated from the connection between the respective fibers, the switch SW is opened, and since the triac TRIAC is not ignited, the machine motor M is not driven.

According to the present invention, as mentioned above, since the controller CONT does not have the conductive part, the electrical protection such as the insulation is not required in the arrangement and the occurrence of the electric shock is thereby prevented. Since neither the sliding part nor connection for varying the resistance is necessitated, the durability is superior in the present arrangement and the interrupting plate is only one variable part in the arrangement so that the structure is simple. The shapes of the controller casing 1 and the step plate 4 may be determined by only taking operationability and design into consideration so that the thin stable shape of these components is possible. Furthermore, when the photoconduction is separated the ignition circuit of the speed control semi-conductor element is interrupted and the machine motor is not driven which sufficiently increases the safety of the arrangement.

We claim:

1. A speed control device for sewing machines having a machine motor and a step plate, comprising an electric power source connected to the motor; a light source connected to the power source; a control element connected to the motor for phase-controlling current of the motor; a photo-conductive element connected to said control element for generating an ignition current therein in response to a predetermined amount of light received by said photo-conductive element; two sets of flexible photo-conductive fibers of which one set is adapted to receive light from said light source and the other set is adapted to transmit the light to said photo-conductive element, said sets of said photo-conductive fibers being provided with end portions, the end portions of one set being optically positioned opposite the other set of said photo-conductive fibers to receive light from one another; and a light interrupting plate positioned between the end portions of said sets and secured to said step plate, said light interrupting plate being adapted to be reciprocally moved by said step plate between the end portions of said one set and the end portions of said other set for optically interrupting the light to be passed therebetween and thereby controlling the amount of photo-conduction received by said photo-conductive element due to the light receiving amount, whereby said control element actuates the machine motor in a sense of changing the speed of said motor.

2. The device of claim 1, further including a photo-conductive connector arranged to be inserted into or separated from said flexible photo-conductive fibers to switch the control device on or off, respectively when desired.

3. The device of claim 2, wherein said control element is a triac.

4. The device of claim 3, further including a diac electrically connected between said control element and said photo-conductive element.

* * * * *